United States Patent
Lewinter, Sidney W.

[11] 3,900,879
[45] Aug. 19, 1975

[54] ELECTRONIC COUNTERMEASURES SYSTEM

[75] Inventor: Lewinter, Sidney W., West Orange, N.J.

[73] Assignee: The Singer Company, Little Falls, N.J.

[22] Filed: Apr. 11, 1968

[21] Appl. No.: 720,674

[52] U.S. Cl. .................... 343/113 R; 324/85
[51] Int. Cl.² ............................................. G01S 3/48
[58] Field of Search ............ 343/113, 113.1; 324/85

[56] References Cited
UNITED STATES PATENTS

| | | | |
|---|---|---|---|
| 3,251,062 | 5/1966 | Ghose | 343/117 A X |
| 3,307,193 | 2/1967 | Kaufman | 343/113.1 |

*Primary Examiner*—Maynard R. Wilbur
*Assistant Examiner*—Richard E. Berger
*Attorney, Agent, or Firm*—Thomas W. Kennedy

[57] ABSTRACT

A system for measuring the angle of arrival and frequency of a radiated wave with respect to a defined line, comprising in combination, first and second input terminals for receiving said radiated wave defining points of arrival and said defined line; first and second local frequency oscillator means for supplying first and second preset different frequencies separated by a predetermined number of herz in the frequency spectrum; first and second mixers receiving said respective first and second inputs from said input terminals and said local oscillator means providing first and second beat frequencies; first and second filter means coupled to said first and second mixers to select predetermined frequency components of said beat frequencies; a first phase comparator coupled to said first and second mixers providing a first train of pulses separated by a time corresponding to the difference in the local frequencies; a second phase comparator coupled to said first and second local oscillators also providing a train of pulses separated by a difference corresponding to the local frequencies, the time separation between corresponding pulses in said two pulse trains being a function of the angle of arrival and the frequency of the incoming wave; and, a third phase comparator coupled to said first and second mixers also providing a train of pulses separated by a difference corresponding to the local frequencies, the time separation between the third and second pulse trains being a second function of the angle of arrival and the frequency of the incoming wave.

6 Claims, 16 Drawing Figures

PRIOR ART

INVENTOR.
SIDNEY W. LEWINTER

BY

ATTORNEY

INVENTOR.
SIDNEY W. LEWINTER

INVENTOR.
SIDNEY W. LEWINTER

BY

ATTORNEY

ELECTRONIC COUNTERMEASURES SYSTEM

BACKGROUND OF THE INVENTION

1. Field of the Invention

The present invention relates to electronic countermeasures to locate radio frequency emission and more particularly to systems for the location of emitting stations.

2. Description of the Prior Art

As has been proven in the Vietnam war, it is important for United States forces to detect and locate enemy radiation emission so that appropriate countermeasures can be taken. In its simplest theoretical form, the first phase of locating such a radiation emission consists in receiving the emitted radiation at two spaced apart antennas and observing the time or phase difference between the received signals. Thus if a signal is emitted at a distant station at a certain frequency and arrives at an angle to a line which is defined by two antennas, it will hit the first of the two antennas at one time and the second antenna at a later time. Therefore, knowing the frequency, $f$, of the emitting station and the distance, $d$, between antennas, it is possible to obtain the phase angle difference between the time the signal strikes the first and the second antenna and thus ascertain the direction of the emitting station. With two or more directional fixes from different locations, the emitting station is located. If the frequency, $f$, of the emitting station is also unknown, then, the problem becomes that of solving an equation with two unknowns.

Figure 1:
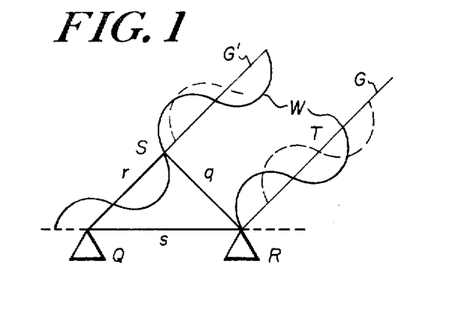
FIG. 1 is a two-dimensional explanation in terms of plane geometry of one of the problems to be solved.
Figure 1A:
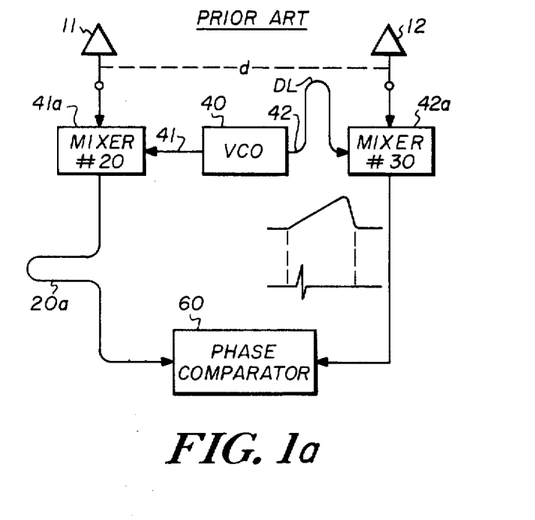
FIG. 1a is a block diagram of a prior art system used for the solution of the problem shown in FIG. 1 and other related problems.

In FIG. 1 the problem is portrayed in terms of plane geometry.

A wave, W, having a wave length $\lambda$ arrives at two antennas Q and R, separated by a distance, s, such that it enters the antenna at a zero nodal point. If the wave does not enter at a zero nodal point as shown by the dotted wave length, it is a simple matter to "slide" the wave "down" on the paper so as to make it enter at the zero point. The wave can be considered as traveling along parallel guide paths G and G'. If we consider antennas Q and R as angle apexes and draw a perpendicular from point R which intersects guide path G' at point S, a right triangle QRS is formed with sides qrs opposite the respective angles, and the angle of arrival as ROS.

There is also an electrical phase angle associated with this angle of arrival. This phase angle is a function of both the frequency and the angle of arrival.

There is a known prior art detection and locating broadband phase measuring system using microwave pulses. This system employs a wide open non-sweeping receiver, which is the basis of its ability to detect and analyze signals on a single pulse or a minimal number of pulses. The system therein described, phase compares pairs of input signals. RF energy is impressed at first and second terminals from a pair of antennas spaced by a known baseline. The phase difference of the two input signals is a function of angle of arrival, in accordance with the well-known interferometer principle. The two signals are heterodyned by a common voltage controlled oscillator (VCO) supplying heterodyning frequency in a pair of mixers. Since a heterodyning process preserves phase differences, any phase difference of the signal inputs at the first and second terminals adds to the phase difference of the signals at the mixer outputs. The heterodyning frequency is fed to one mixer across a first delay line. A second delay line, if present, introduces an additional phase shift in one signal input to a phase comparator.

At some frequency of the VCO, the phase shift introduced by the first delay line will exactly equal the combined phase shifts due to angle of arrival and second delay line. Under this condition, the phase of the two signal inputs to the phase comparator will be equal, and the phase comparator will produce an output indication of this state. The VCO is linearly swept in frequency. The first delay line is long enough so that the number of wave lengths on the line differs by one (360°) over the extremes of VCO frequency. (In another version, it is necessary to achieve only 180° differential phase shift.) Thus, there will always be one frequency within the sweep range of the VCO for which phase equality at the comparator exists, and a pulse will be generated at a particular time within the sweep range of the VCO. The timing of this pulse relative to the initiation of the ramp is a measure of the total phase shift of the signal produced by angle of arrival and second delay line.

In this prior art system, measurements are made in four phase comparators, using two different antenna baselines and two values of the second delay line. This is sufficient to resolve ambiguities in frequency and angle of arrival by solution of four simultaneous equations. The details of the solution process need not concern us here.

The essence of this prior art technique is the use of a common VCO in combination with a pair of mixers, one of which uses an accurate first delay line at its local oscillator input port. By means of a linear ramp, differential accurate phase shifts of up to 360° are rapidly generated at the inputs to the mixers. The combination of the VCO and first delay should be thought of as an accurate, rapidly variable differential phase ramp generator. The fact that the frequency of the VCO must be varied to obtain the differential phase shift is of no consequence, since the system is not frequency sensitive, only phase sensitive. As long as the emitter pulse is on for longer than the phase ramp duration, the pulse can be analyzed.

The disadvantages of this prior art technique can be grouped in two categories: practical and fundamental. In the category of practical disadvantages, there are the tight tolerances on several parameters, including: the length of the first delay line, the frequency of the VCO at the initiation of the ramp, the slope of the ramp and the linearity of the ramp. To some extent these tolerances (except the linearity requirement) can be eased by use of a self-text oscillator that injects an accurate known frequency periodically, to calibrate the initiation frequency and slope of the ramp, and to compensate for temperature variations in the delay line. In practice it is found that the range of compensation available is limited and inadequate, and the self-test feature introduces undesirable cost and complexity of its own.

A more fundamental disadvantage is an inherent nonlinearity of the system that is observed when the ramp is made fast enough to accommodate emitter pulses of very short duration. Briefly, this may be described as an effect due to a lack of a steady-state condition on the delay line. If the differential line length produced by the first delay line is L, the differential phase shift is $$\phi = \frac{2\pi L}{\lambda} = \frac{2\pi L f}{C}$$

where $\lambda$ is the wave length on the line, $f$ is the frequency of the VCO, and C is the velocity of propagation along this delay line. These expressions assume that at any given time the values of $\lambda$ and $f$ are the same at all points in the delay line. This is only accurate when the frequency of the VCO is a constant or changing at a rate which is slow compared with the time of transit on the delay line. If the ramp is made very fast, the frequency at the input and output of the delay line may differ significantly, and the linear relationship between $\phi$ and $f$ in the above equation no longer exists. Thus, if we consider the delay line as a length of tubing with waves therein, a fast frequency change produces an accordion-like effect therein with spread out waves in some parts and bunched waves at others. In fact, there is an interval following the initiation of the ramp during which the output of the delay line is unaware that the ramp has begun. Hence, there is an interval, equal to the time delay of the first delay line, when the frequency at the input to one mixer is ramping, while the frequency at the other mixer maintains its initial value. This interval is approximately 10 nanoseconds. Since the nominal duration of the ramp is about 200 nanoseconds, this is not negligible and is in fact equal to 6.4 counts in a seven bit word.

The effect of this delay is as follows: During the initial period of the ramp, the frequency is varying linearly at one mixer input only. Since what is needed is the differential phase between the two mixer inputs, the change in instantaneous frequency is integrated to obtain differential phase as $\Delta\phi = \int \Delta\omega dt$. Since $\Delta\omega$ is linear, $\Delta\phi$ is parabolic. As soon as the linear frequency ramp reaches the output of the first delay line, the variation in phase at the second mixer input becomes likewise parabolic, but delayed in time. The difference in the two parabolas is linear, and hence the mode of behavior of the line after the start up is approximately correct.

The initial nonlinearity of the sweep was actually observed in tests of the prior art device, but incorrectly attributed to a lag or inertia in the Klystron VCO. The Klystron modulation characteristic is extremely broad band and could not have contributed measurably to this effect. The effect was due to the delay line characteristics.

The nature of the present invention and the objects and advantages thereof will be more readily understood by those skilled in the art after consideration of the following detailed description taken in conjunction with the accompanying drawings.

BRIEF DESCRIPTION OF THE DRAWINGS

FIG. 1b is a more detailed block diagram of the prior art system shown in FIG. 1a;

DETAILED DESCRIPTION OF THE PREFERRED EMBODIMENTS

Figure 1B:
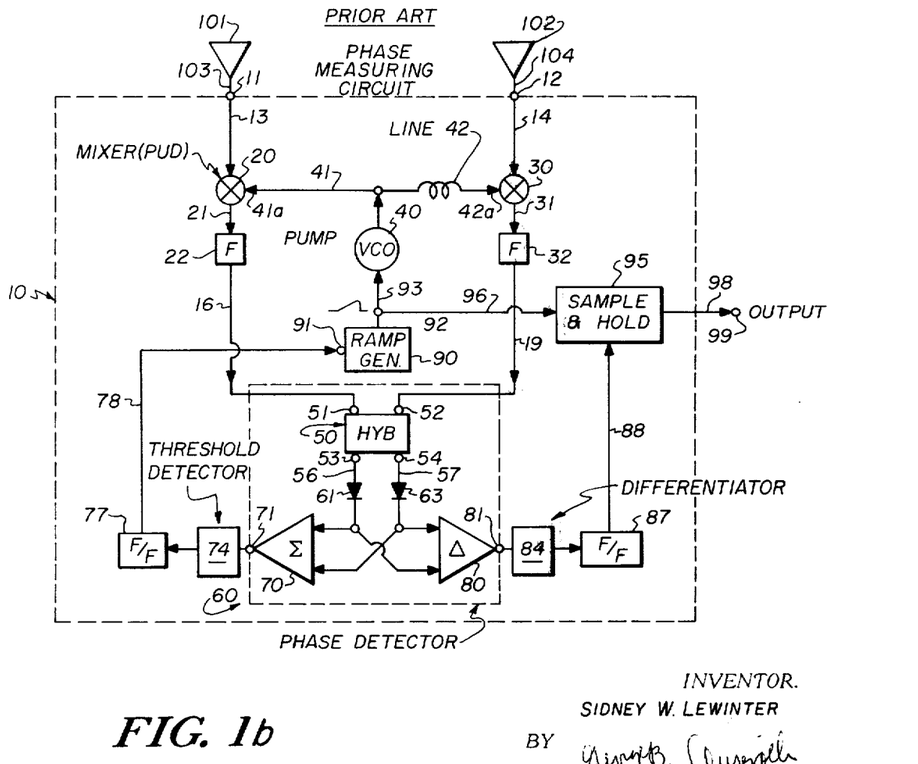
Figure 2A:
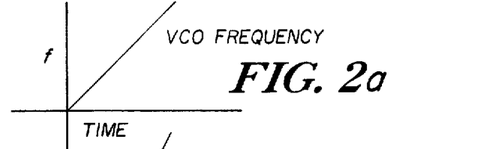
FIG. 2a through FIG. 2d are phase diagrams showing the phase angle of signals at various locations.
Figures 2B, 2C, 2D:
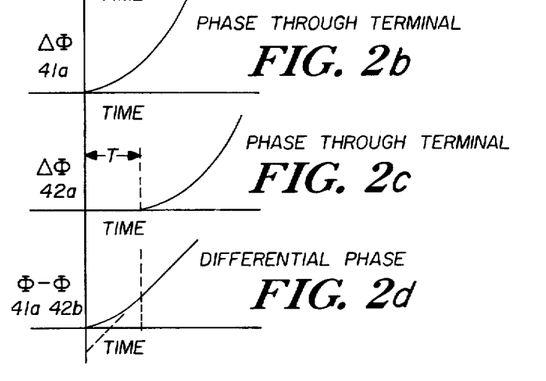

To visualize the operation of the present invention, it is first necessary to thoroughly understand the operation and defects in the aforesaid prior art arrangement hereinbefore mentioned and shown in FIG. 1b where a signal is received at two antenna input terminals 11 and 12 spaced apart by a preset distance, $d$. The signal received at each antenna input terminal 11 and 12 is fed to respective mixers 20 and 30. These mixers also receive through terminals 41a and 42a a local pump frequency from a voltage controlled oscillator (VCO) 40. The signal to mixer 20 is fed there directly through line 41a but the signal to mixer 30 is fed over delay line 42a. The outputs of mixers 20 and 30 are fed to a phase comparator 60. The output of mixer 30 is fed directly whereas that of mixer 20 is fed through a delay line 20a.

This circuitry is shown in greater detail in FIG. 1b of the drawing showing a block diagram of the basic prior art system of the phase measuring device, the circuit being generally indicated by the reference numeral 10 and enclosed within the dashed line rectangle. The phase measuring device 10 is provided with two signal input terminals, designated by the reference numerals 11 and 12, for application to the system of the electrical signals between which phase differences are to be measured.

Signals applied to the input terminal 11 are fed to a first up-converter device 20 by an electrical lead 13. Signals applied to the input terminal 12 are fed to a second up-converter device 30 by an electrical lead 14. The up-converters 20 and 30 function as mixers in an up-conversion heterodyne system as will be hereinbelow explained. The up-converters 20 and 30 can be the conventional resistive type of microwave mixer or can be parametric up-converters.

The RF carrier fed to the up-converters by leads 13 and 14 is commonly referred to as the "signal frequency," and the RF from the local oscillator is commonly referred to as the "pump frequency." In the prior art circuit, a voltage controlled oscillator 40 is provided as a common pump for both of the up-converters 20 and 30, the VCO output being fed to the up-converter 20 by a transmission line 41 and to the upconverter 30 by a transmission line 42, the effective length of the transmission line 42 being longer than that of the line 41. The VCO 40 can be viewed as the local oscillator in the heterodyne system with the up-converters 20 and 30 functioning as mixers.

The outputs of the up-converters 20 and 30 are at frequencies which are the sum and difference of the pump frequency and the signal frequency. For example, reception of a 2 Gc (gigacycle or gigaherz) signal with a 14 Ghz pump frequency will result in upconverter outputs at 12 and 16 Ghz. Only the difference frequency ouptut of resistive mixers is used so the output of the up-converter 20 is fed through an electrical lead 21 to a low pass filter 22 having a cutoff frequency slightly higher than the highest difference frequency to be encountered, in order to filter out the pump frequency and the sum frequency output. In a similar manner, the output of the up-converter 30 is fed through an electrical lead 31 to a low pass filter 32. In a similar manner, the output of the up-converter 30 is fed through an electrical lead 31 to a low pass filter 32. In a typical system for operation over the 3 to 1 bandwidth of 2–6 Ghz and with the VCO 40 operating at 14 Ghz, the cutoff frequency of the low pass filters 22 and 32 are slightly above 12 Ghz since the up-converter outputs will be within the range of from 8–12 Ghz with the lowest sum frequency output being 14 Ghz.

The output of the low pass filter 22 is fed to an input terminal 51 of a hybrid junction 50 through an electrical lead 16. The output of the low pass filter 32 is fed to an input terminal 52 of the hybrid junction 50 through an electrical lead 19. The hybrid junction 50 has two output terminals 53 and 54. The characteristics of the hybrid junction 50 are such that upon application of a signal to its input terminal 52, the phase of the signal appearing at the terminal 54 will be lagging 90° with respect to that of the signal appearing at the terminal 53; similarly, upon application of a signal to its input terminal 51, the phase of the signal appearing at the terminal 53 will be lagging 90° with respect to that appearing at the terminal 54, thereby providing a combination in phase quadrature of signals applied to the hybrid junction input terminals 51 and 52.

Hybrid junctions are well known in the art and hence will not be discussed in detail beyond stating that in the hybrid junction 50 there is no direction intercoupling of the input terminals 51 and 52, thereby allowing the isolation of these input terminals from each other while coupling signals from both of its input terminals to each of its output terminals. Hence, input signals are independently vectorially combined in phase quadrature at the outputs of the hybrid junction 50 with no significant interaction between signals applied to its two input terminals 51 and 52.

One hybrid output is fed from the output terminal 53 to the anode terminal of a diode video detector 61 through an electrical lead 56. The other hybrid output is fed from the output terminal 54 to the anode terminal of a diode video detector 63 through an electrical lead 57. For efficient operation at microwave frequencies, the electrical leads 13, 14, 16, 19, 21, 31, 56, and 57 are preferably sections of wave guides or coaxial cables, although shorter lengths may be stripline.

The cathode terminal of the diode 61 is connected to one input of a summing amplifier 70 and to one input of a difference amplifier 80. The cathode terminal of the diode 63 is connected to another input of the summing amplifier 70 and to another input of the difference amplifier 80. The summing amplifier 70 is provided with an output terminal 71, the summing amplifier 80 being provided with an output terminal 81.

The signals appearing at the summing amplifier output terminal 71 are pulses having their magnitudes determined by the sum of the magnitudes of the signals appearing at the hybrid output terminals 53 and 54, which in turn represent the vector sums of the signals applied to the hybrid terminals 51 and 52 added in phase quadrature, i.e., $E_{53} = E_{51} + jE_{52}$ and $E_{54} = E_{52} + jE_{51}$, the signals appearing at the difference amplifier output terminal 81 are pulses having their magnitudes determined by the difference in the magnitudes of the signals appearing at the hybrid junction output terminals 53 and 54. Thus, it can be seen that the hybrid junction 50, the diodes 61 and 63, the summing amplifier 70, and the difference amplifier 80 effectively form a phase detector having sum and difference outputs with the difference output yielding zero output for in-phase signals applied to terminals 51 and 52 and yielding an increasing output for small decreases of phase shift between the signals applied to 51 and 52, this phase detector being generally indicated by the reference numeral 60 and enclosed within a dashed line rectangle. Of course, other suitable embodiments of such a phase detector will be apparent to those skilled in the art.

Output terminal 71 of the summing amplifier 70 (the sum output of phase detector 60) is fed through a threshold detector 74 to a flip-flop 77, the output of the flip-flop 77 being fed through an electrical lead 78 to an input terminal 91 of a ramp generator 90. The ramp generator 90 functions to generate a voltage ramp pulse when triggered by a voltage pulse applied to its input terminal 91. The term "voltage ramp pulse" as used herein refers to a triangular pulse having a steep trailing edge so as to form a pulse substantially in the shape of a right triangle, as indicated in FIG. 1b by the exemplary wave shape appearing above the ramp generator 90. The voltage ramp pulse output of the ramp generator 90 is applied through an electrical lead 93 to the VCO 40 as the control voltage therefor. The VCO 40 is a microwave oscillator, the output frequency of which can be varied in response to an applied control voltage, a Klystron type of oscillator being presently preferred.

Output terminal 81 of the difference amplifier 80 (the difference output of phase detector 60) is fed through a differentiator 84 to a flip-flop 87, the output of flip-flop 87 being fed through an electrical lead 88 to one input of sample and hold circuitry generally indicated by the reference numeral 95, the output of the ramp generator 90 also being fed to another input of the sample and hold circuitry 95 through an electrical lead 96.

The sample and hold circuitry 95 is arranged to be triggered by the leading edge of an output pulse from the flip-flop 87, and, when triggered, functions to sample the voltage appearing on electrical lead 96 at that instant and to produce an output pulse having a magnitude equal to that of the sampled voltage. The output of the sample and hold circuitry 95 is fed through an electrical lead 98 to an output terminal 99. The magnitude of the sampled ramp voltage appearing at terminal 99 is proportional to the phase difference initially applied to terminals 51 and 52.

In operation, the electrical signals between which relative phase difference is to be measured are fed to the input terminals 11 and 12, these signals being upconverted in the respective up-converters 20 and 30. The phase measuring circuit 10 is directly adaptable for direction finding use by merely connecting the device to an antenna array. In the embodiment of FIG. 1b, a two-antenna array is shown, the antennas being designated by the references numerals 101 and 102. The antenna 101 is connected to the input terminal 11 of the phase measuring circuit 10 by an electrical lead 103, the antenna 102 being connected to the input terminal 12 by an electrical lead 104. With any antenna orientation other than directly broadside, an incoming signal wave front will impinge on one of the antennas before it arrives at the other antenna, thereby giving rise to a phase difference between the signals appearing at the input terminals 11 and 12, this phase difference being indicative of the angle of arrival of the wave front.

The signals fed to the input terminals 11 and 12 are up-converted in the respective (mixers) up-converters 20 and 30. The signals injected into the up-converters from the local oscillator 40 are given by:

$$E_{20} = e^{j\omega_L t}$$
$$E_{30} = e^{j\omega_L t \, + \, \omega_L \Delta 1/C}$$

Where, $E_{20}$ = voltage applied to up-converter 20 through transmission line 41

$E_{30}$ = voltage applied to up-converter 30 through transmission line 42

$\Phi_L$ = angular frequency of VCO 40

$\Delta 1$ = difference in effective line lengths of transmission lines 41 and 42

$C$ = velocity of propagation in lines 41 and 42

The difference in phase ($\Delta\phi$) at the up-converters (mixers) 20 and 30 is then:

$$\Delta\phi = \frac{\omega_L \Delta 1}{C} = \frac{2\pi f_L \Delta 1}{C} = \frac{2\pi \Delta 1}{\lambda_L}$$

Now for example if $\Delta 1/\lambda_L = 50$, then a change of 1 percent in $\lambda_L$ (or the frequency of VCO 40) will cause a 180° change in the phase difference between the pump signals fed to the two mixers. This phase difference is preserved in the mixing process and adds to the phase difference of the input signals at terminals 11 and 12.

The up-converted signal outputs of the mixers 20 and 30 are applied to the respective low pass filters 22 and 32 so that only the difference frequency outputs are fed to the phase detector 60. The leading edge of the output pulse from the summing amplifier 70, assuming that it is of sufficient magnitude to pass through the threshold detector 70, triggers the flip-flop 77, the output of the flip-flop 77 in turn triggering the ramp generator 90 to initiate a ramp voltage output pulse. Thus, the voltage ramp is synchronized to the leading edge of the summed signal output pulse to the phase detector.

The voltage ramp output of the ramp generator 90 is fed to the VCO 40 as the control voltage therefor, frequency modulation of the VCO 40 with this voltage ramp changing its output frequency in a linear manner, thereby causing an increasing phase shift difference in the up-converted signals due to the different effective line lengths which feed the pump frequency to mixers 20 and 30. Thus, the difference frequency output of the phase detector 60 (appearing at the output terminal 81) is continually changing due to the changing difference in phase between the up-converted signals fed to the phase detector. This changing difference output is differentiated in order to determine the instant of the phase reversal (zero cross-over point) of the signals fed to the phase detector. The output of the differentiator 84 provides positive and negative pulses at the zero cross-over points, the polarity of the pulses depending upon the direction of the relative phase reversals. For example, a positive going zero cross-over might produce a positive differentiator output pulse, a negative going zero cross-over than producing a negative differentiator output pulse.

The flip-flop 87 is of the type which is triggered only by positive pulses, hence will be triggered in the present circuit only by differentiator output pulses resulting from positive going zero cross-overs.

Thus, it is apparent that at some time after the voltage ramp is initiated the phase detector output will indicate a change from a leading to a lagging phase relationship between the signals applied to its input terminals 51 and 52. At the instant of a positive going zero cross-over, the flip-flop 87 is triggered; and the sample and hold circuitry 95 then functions to measure the instantaneous value of the ramp voltage appearing on the electrical lead 96 and to hold this voltage (while the ramp voltage continues on to its maximum value), this voltage being proportional to the phase difference that initially existed between the applied input signals.

The antennas 101 and 102 are spaced apart by several wave lengths, if possible, in order to increase accuracy of angle-of-arrival measurements, to allow the use of broader band (and consequently larger) antennas without physical interference, and to avoid mutual coupling effects.

In the system just described, the voltage controlled oscillator (VCO) provides a frequency ramp and a graph of the phase difference; and frequency is shown in FIGS. 2a to 2d. As can be seen, the local signals supplied through terminals 41a and 42a are identical in form but offset in time by the delay T.

Figure 3A:
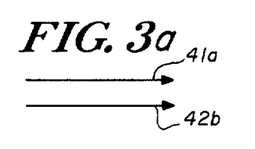
FIGS. 3a and 3b are phase relationship explanations in terms of vector diagrams.
Figure 3B:
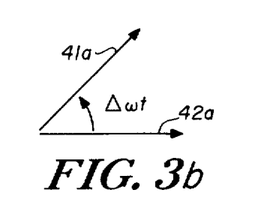

As previously pointed out, the difference in phase is given as $\Delta\phi = \int \Delta\omega dt$. Before the delay line begins to respond to the changing input frequency, the differential phase is parabolic, which is simply the integral of the linear input frequency. Since a linear, rather than a parabolic, phase change is desired, the input frequency should be a step function rather than a linear ramp. The phasor diagram of FIGS. 3a, 3b illustrates the behavior of the local oscillator voltage at terminals 41a 42a if a step function replaces the linear ramp. Initially, the two voltages are in phase. At $t = 0$, the VCO is abruptly changed in frequency by an amount $\Delta\omega$. Thereafter, a phase $E_{41a}$ advances in phase linearly with respect to $E_{42a}$. This advance continues and can equal or exceed 360° depending upon the length of the delay line. When the new frequency reaches the output of the delay line, the relative phase advance stops and the relative phases remain constant.

Hence, there is a new method of generating rapid linear phase shifts: Apply a frequency step into a delay line. The length of the line should equal the duration of the phase ramp. The step of frequency should be initiated by the threshold detector (or it can free run). A numerical example follows. Suppose a ramp duration of 100 nanoseconds is desired. During the 100 nanosecond interval, the phase ramp should sweep through a complete 360° rotation. The change in frequency required is:

$$f_1 - f_2 = \frac{\omega_1 - \omega_2}{2\pi} = \frac{1}{2\pi}\left(\frac{\Delta\phi}{\Delta t}\right) = \frac{1}{2\pi}\left(\frac{2\pi}{10^{-7}}\right) = 10 \text{ Mhz}$$

The meaning of the above result is that if the frequency is stepped upward by 10 Mhz, and the instantaneous phase of the new sinusoidal voltage is compared with its original extrapolation, the phase is observed to advance at a linear rate, going through a complete 360° rotation in 100 nanoseconds. This, however, requires a delay line that is at least 100 nanoseconds long, an impractical length unless, perhaps, stripline can be adapted to this purpose.

At this point it is recognized that the only purpose of the delay line is to extrapolate, for 100 nanoseconds, the phase memory of the original signal before its frequency was incremented by 10 Mhz. Therefore, instead of eliminating the original frequency at the beginning of the phase ramp, why not allow it to continue for at least 100 nanoseconds and compare its phase with the new frequency directly?

Figure 4:
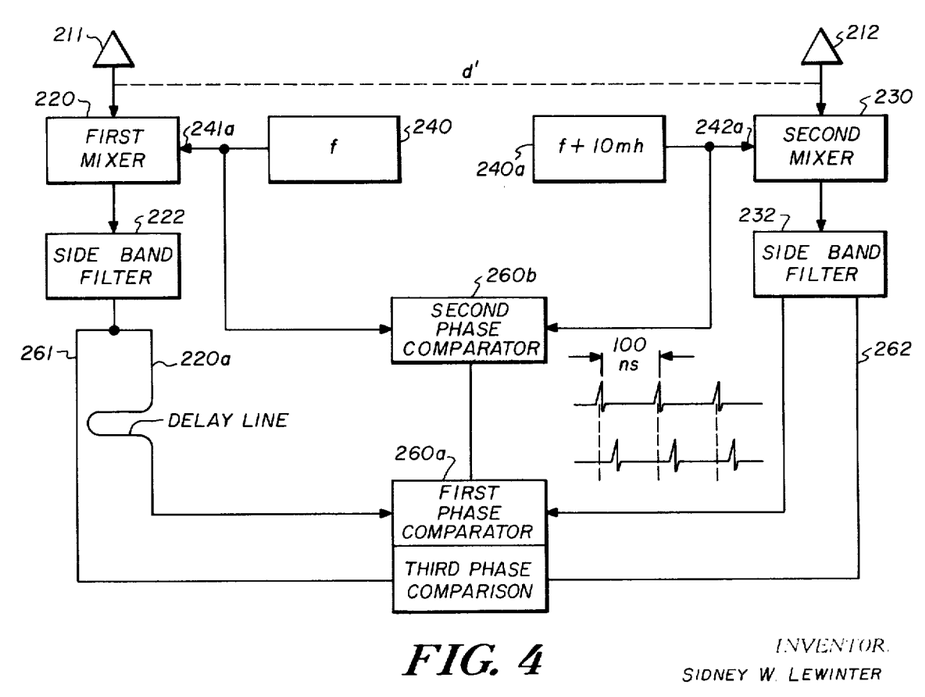
FIG. 4 is a block diagram of one embodiment of the present inventive concept.

A practical way to achieve this objective is simply to use two c-w oscillators spaced 10 Mhz in frequency. The relative phase of the two signals will advance at a 10 Mhz rate. Every 100 nanoseconds the phase will go through another multiple of 360° (or in effect through zero). The entire system must now be timed from the phase cross-over of the two local oscillators, instead of from the initiation of a video ramp. FIG. 4 shows a block diagram of this arrangement.

The signal is received at two separate antennas 211 and 212 separated by a fixed distance $d'$. The signal as received by each antenna is fed to mixers 220, 230 which in turn are fed heterodyning frequencies by local oscillators, 240, 240a, these heterodyning frequencies are $f_1$ and $f_1+10$ Mhz. The heterodyning frequencies are fed to input terminals 241a, 242a in the mixers producing local beat frequencies in mixers 220, 230. These beat frequencies are filtered in sideband filters 222 and 232. From the sideband filters 222, 232, the signals are fed to a first phase comparator 260a, the signal from sideband filter 222 passing across a first delay line 220. The heterodyning frequencies $f_1$ and $f_1+10$ Mhz are also fed to a second phase comparator 260b and the two phase comparators 260a, 260b are then compared. Also, the signals from the mixer are compared without passing through the delay line in a third phase comparator.

The second phase comparator provides 100 nanosecond spaced reference pulses. The output of the first phase comparator will be a second train of 100 nanosecond pulses, which persists as long as the input emitter signal is present. The relative timing of the two pulse trains provides an indication of the total phase shift due to angle of arrival and delay line.

The output of the third phase comparator will be a third train of 100 nanosecond pulses, which also persists as long as the emitter signal is present. The relative timing of the pulse train outputs from the first and third phase comparator is solely a function of the delay line length and hence the frequency of the input signal.

This is the same information as provided in the aforementioned prior art arrangement by the timing of the phase comparator output with respect to the initiation of the ramp. By this technique, delay line 42 has been eliminated. This is an expensive machine assembly, requiring temperature compensation. The Klystron voltage controlled oscillator has been replaced by a pair of c-w oscillators spaced by a nominal amount (i.e., 10 Mhz). This is a saving of considerable space since the c-w oscillators can be solid-state, requiring no high voltages. They can be readily frequency stabilized, and since they are non-swept, linearity requirements of the voltage controlled oscillator and ramp generator are automatically eliminated. Furthermore, the self-test of the oscillator and the test loop can be eliminated, since the intrinsic accuracy of each of the c-w oscillators is very high.

Finally, the system can respond to shorter emitter pulses, an important consideration. The intrinsic non-linearities in the aforesaid method (plus many practical difficulties) combine to limit minimum pulse width to perhaps 300 nanoseconds, even with degradation in accuracy. The present system does not suffer from this defect. A complete linear 360° phase shift is accomplished in every 100 nanoseconds, using a pair of oscillators spaced 10 Mhz in frequency. If it is desired to speed this operation up by a factor of two to one, it is only necessary to space the frequencies by 20 Mhz rather than 10 Mhz.

From the foregoing, it is apparent that it was necessary to individually control the frequencies of a pair of c-w oscillators such that their difference in frequency is an accurate stable amount, such as 10 Mhz. Since each oscillator can be at a frequency of the order of 14 Ghz, and a precision of timing of the order of 1 percent may be desired, it is necessary to control frequency to one part in $$100 \times \frac{14 \times 10^9}{10 \times 10^6} = 1.4 \times 10^5.$$

It is apparent that the absolute frequency of each oscillator is of no importance, as long as the difference frequency remains stable. It is also possible to do this by modulating either by AM or FM a relatively unstable microwave oscillator with a stable lower frequency source, and extracting the sidebands to use as local oscillator voltages. For example, a balanced modulator operating at Ghz carrier can be used, modulated by a stable 5 Mhz source. The carrier is cancelled out, and the AM sidebands, spaced 10 Mhz from each other, are directly obtainable.

In view of the extremely short measurement times made possible by this technique, improved methods of processing the output signals of the phase comparators may be needed. For example, if a 10 Mhz spacing of the two local oscillators is employed, the entire information content of the system is contained in a time measurement which interpolates an accurate fraction of 100 nanoseconds. Thus, if conventional pulse techniques are used, resolution of the order of a nanosecond would be necessary. The prior art system uses a sample and hold circuit in conjunction with a slow ramp to, in effect, stretch the time scale by a factor of about 15 to 1. This technique is useful for an aperiodic system (one in which a processing cycle is triggered by an input signal breaking threshold). Even in that case difficulties are presented whenever two signals occur within the lengthened processing time (7 $\mu$s). This had led to use of A and B registers as an expedient to prevent system overflow if the input data rate temporarily (for two pulses) exceeds the internal processing speed.

The post-detection processing technique presently used does not take full advantage of the capabilities of a periodic system (one in which internal events are timed by a clock rather than by the detection of an input signal). It is therefore necessary to have improved analog-to-digital conversion, which is fully compatible with the pre-detection processing capabilities of the sensor. Such an improved technique has the additional advantage of permitting operation in an extremely dense emitter environment.

Figure 5:
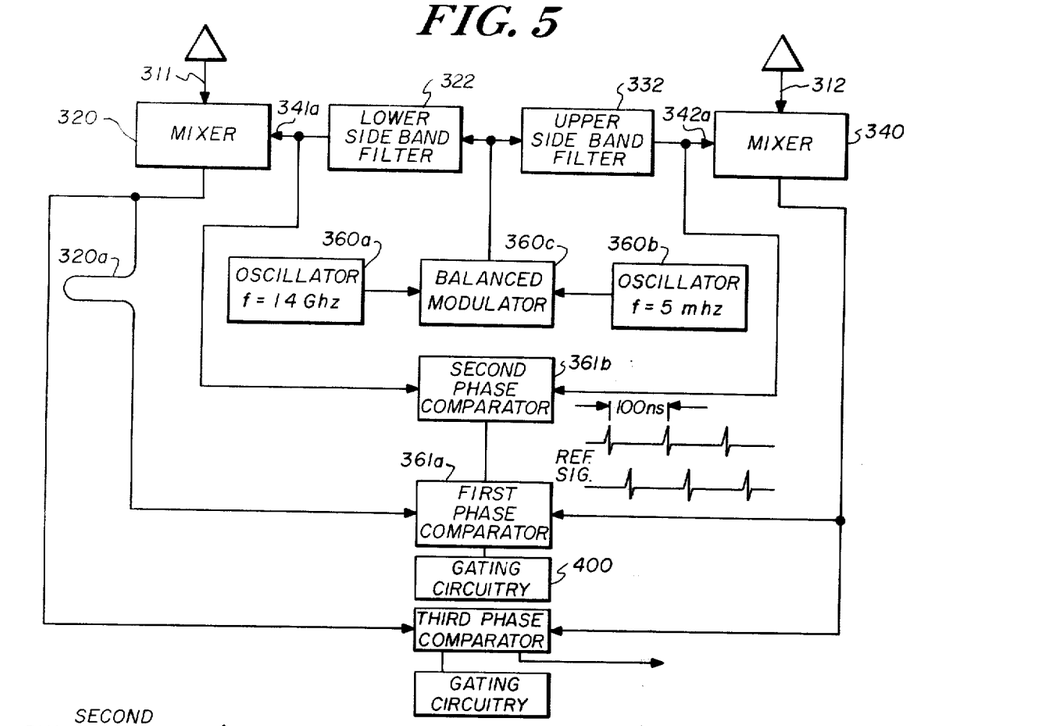
FIG. 5 is a block diagram of another embodiment of the present inventive concept.

The block diagram of FIG. 5 lends itself particularly well to a high-speed technique for analog-to-digital conversion. Here, there are the two antennas 311, 312 separated by the fixed distance which are feeding signals to mixers 320, 340. The heterodyning frequency is supplied by a 5 Mhz oscillator 360b, and a 14 Ghz oscillator 360a feeding to a modulator 360c. The upper and lower sidebands are removed from the modulator output in filters 322, 332 which in turn feed the heterodyning frequencies to mixers 320, 340 through terminals 341a, 342a. The signals from mixers 320, 340 go to a first phase comparator 361a while the heterodyning frequencies are fed to a second phase comparator 361b. The signal from mixer 320 to first phase comparator 361a passes over delay line 320a. The output of the first and second phase comparators 361a, 361b are then compared. The third phase comparator operates as in FIG. 4.

Figure 6A:
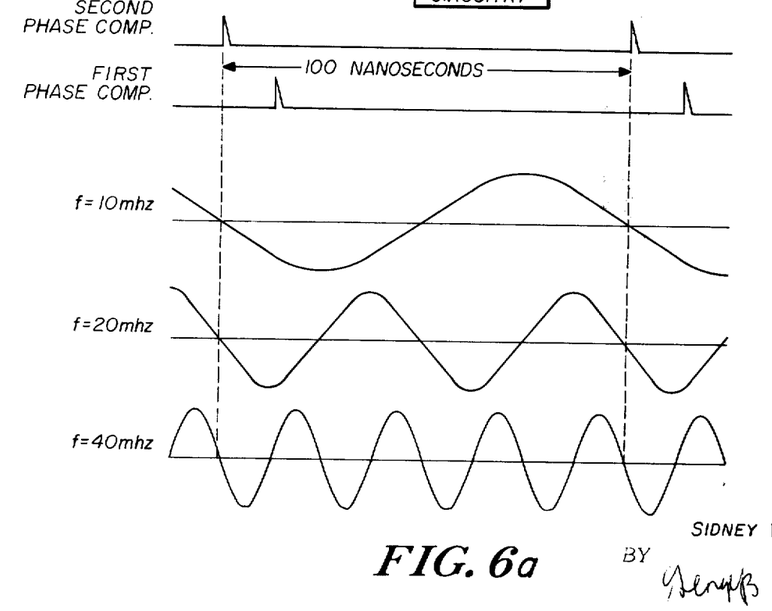
FIGS. 6a and 6b are wave form diagrams to show how the output from the embodiment of FIG. 5 can produce a digital value.
Figure 6B:
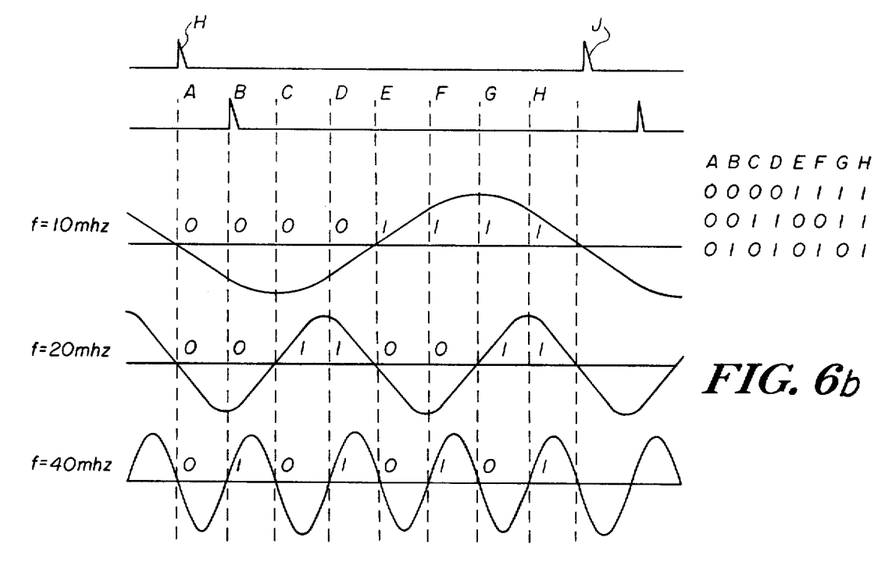

Certain gating wave shapes derived by multiplication of the 5 Mhz clock are developed in a predetermined phase relationship with respect to the output of the second phase comparator. The output of the first phase comparator is gated with each wave shape in a bank of parallel gates. The polarity of the gate output corresponds to a one or a zero in 8-4-2-1 code. The gate outputs can then be used to establish a serial bit stream. The output wave forms from the comparator and the reference oscillator are shown in FIGS. 6a and 6b.

Figure 7A:
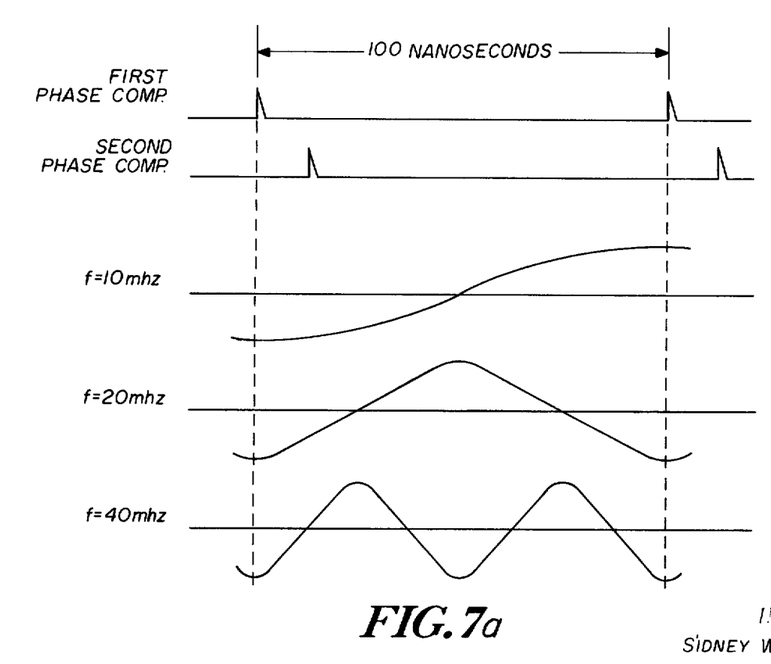
FIGS. 7a and 7b show the same wave forms as in FIGS. 6a and 6b but phase-shifted to form the Grey code; and, FIG. 8 is a block diagram of a circuit used to produce an 8-4-2-1 binary code output.
Figure 7B:
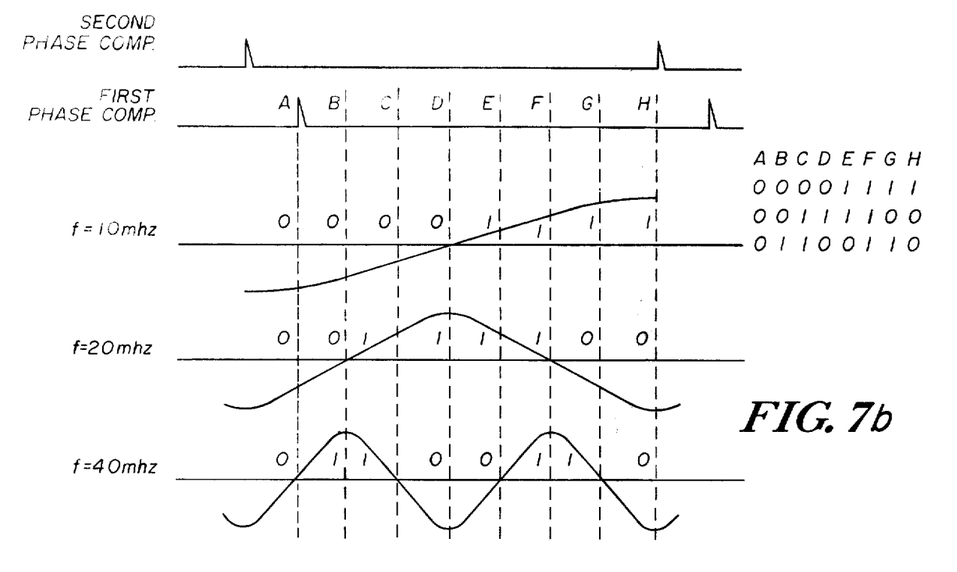

If an 8-4-2-1 binary code is used (often called a "straight" binary code), the technique can generate errors whenever the timing of the signal pulse is near the point of zero cross-over of one of the sine waves. Second, the frequency of the sinusoids becomes uncomfortably high when a large number of bits are to be generated. For a seven bit word, the highest frequency is 640 Mhz. The error problem is eliminated when coding into Grey (cyclic permutation) code. The problem of operating with high frequencies will be relieved by a factor of two in this case. A wave shape diagram is shown in FIGS. 7a and 7b. For a seven bit word, the highest gating frequency is 320 Mhz.

Figure 8:
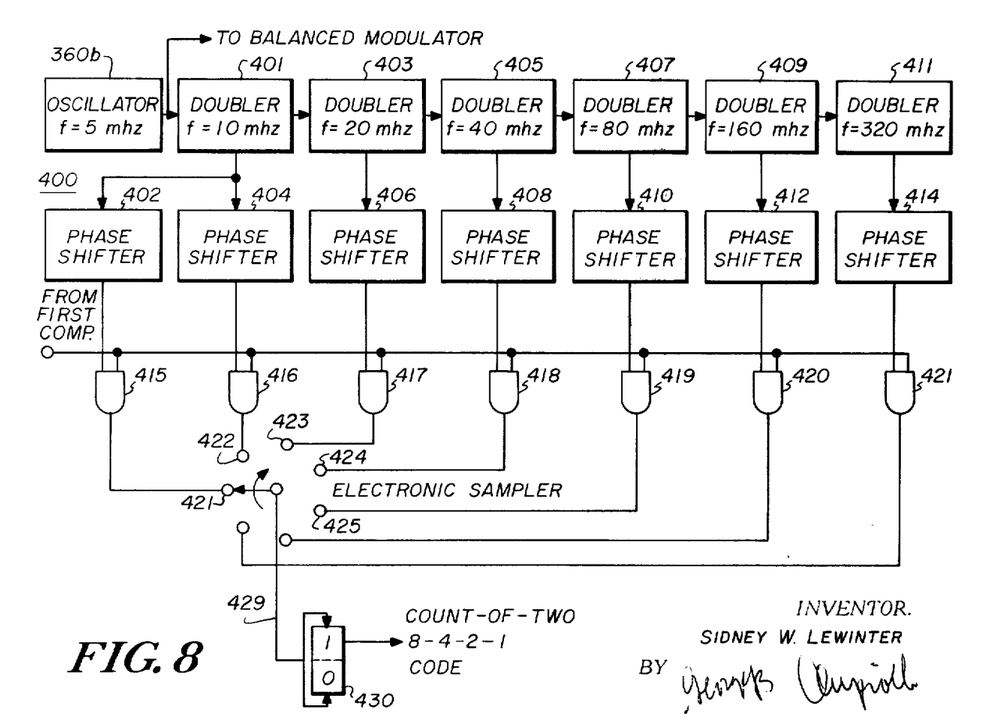

Thus, the 5 Mhz oscillator 360b of FIG. 5 is used as the reference and doubled as shown in FIG. 8 and this doubling continues. These doubled outputs are aligned by a series of phase shifters and each sine wave in proper phase relationship is fed as one input to a series of AND gates which are also fed the pulse train output from the first comparator. The coincidence of the pulses and positive half cycles of the respective sine waves sets the gates so that they can be counted as binary digits. The output of the third comparator is treated in a manner similar to the output of the first phase comparator.

A block diagram of the analog-to-digital conversion technique is shown in FIG. 8. This implements the gating wave form chart of FIGS. 7a and 7b. The gate outputs are serially assembled by the electronic sampler, and trigger a count-of-two flip-flop. This then accomplishes conversion from Grey code to 8-4-2-1 code. The 5 Mhz oscillator 360b of FIG. 5 serves as the reference for the gating circuitry 400 and is doubled in frequency doublers 401, 403, 405, 407, 409, 411, etc. to provide a series of waves of 10 Mhz, 20 Mhz, 40 Mhz, etc. These waves are then phase shifted by phase shifters 402, 404, 406, etc. so as to align them in the Grey code. The output from the first comparator together with the phase shifted wave forms in the Grey code are fed to AND gates 415, 416, etc. These AND gates are associated with flip-flops that are set whenever the pulse output from the first comparator coincides with the positive input of a given sine wave. The output terminals 422, 423, 424, 425, etc. are sampled by a sampler 429 feeding an output to a two-state flip-flop 430. The flip-flop is such that when in either state a trigger pulse will drive the flip-flop to the other state. The result therefore is a Grey code to 8-4-2-1 code conversion according to the following table:

TABLE

| Decimal Number | Grey Code Input | Flip-Flop | | | Binary Code Output |
|---|---|---|---|---|---|
| 0 | 000 | RESET | RESET | RESET | 000 |
| 1 | 001 | RESET | RESET | SET | 001 |
| 2 | 011 | RESET | SET | RESET | 010 |
| 3 | 010 | RESET | SET | SET | 011 |
| 4 | 110 | SET | RESET | RESET | 100 |
| 5 | 111 | SET | RESET | SET | 101 |
| 6 | 101 | SET | SET | RESET | 110 |
| 7 | 100 | SET | SET | SET | 111 |

While the present invention has been described in preferred embodiments, it will be obvious to those skilled in the art that various modifications can be made therein within the scope of the invention, and it is intended that the appended claims cover all such modification.

What is claimed is:

1. A system for measuring the angle of arrival and the frequency of a radiated wave with respect to a defined line, comprising in combination, a. first and second input terminals for receiving said radiated wave defining points of arrival and said defined line;

b. first and second local frequency oscillator means for supplying first and second preset different frequencies separated by a predetermined number of herz in the frequency spectrum;

c. first and second mixers receiving said respective first and second inputs from said input terminals and said local oscillator means providing first and second beat frequencies;

d. first and second filter means included with said first and second mixers to select as output predetermined frequency components of said beat frequencies;

e. a first phase comparator coupled to said first and second mixers providing a first train of pulses separated by a time corresponding to the difference in the local frequencies;

f. a second phase comparator coupled to said first and second local oscillators also providing a train of pulses separated by a difference corresponding to the local frequencies, the time separation between corresponding pulses in said two pulse trains being a function of the angle of arrival and the frequency of the incoming wave; and, g. a third phase comparator coupled to said first and second mixers also providing a train of pulses separated by a difference corresponding to the local frequencies, the time separation between the third and second pulse trains being a second function of the angle of arrival and the frequency of the incoming wave.

2. A system as claimed in claim 1 wherein said first and second local oscillator means use separate local oscillators.

3. A system as claimed in claim 1 wherein said first and second local oscillator means comprise first and second local oscillators, a balanced modulator fed by said local oscillators, and upper and lower sideband filters separately coupled to the modulator to respectively supply lower and upper frequencies to the mixers.

4. A system as claimed in claim 1 having two sets of analog-to-digital conversion means, each set including a series of frequency doublers connected to said local oscillators; a series of AND gates with terminals enabled by two inputs, for each of said frequency doublers, one input terminal of which is connected to the corresponding frequency doubler, said terminal acting to unlock the gate at alternate half cycles of the corresponding frequency, the second terminal of one set being connected to the first phase comparator and the second terminal of the other set being connected to the third phase comparator to enable the respective gates of each set when and if the output pulses from said first and third phase comparators coincide in time with an unlocking alternate half cycle acting on the first input terminal.

5. The system as claimed in claim 4 including phase shifters connected to each of said frequency doublers to shift each frequency to be offset from the next higher and lower frequencies so that together said frequencies are offset to produce a cyclic binary code.

6. The system as claimed in claim 5 wherein each of said AND gates has a separate output line, sampler means to periodically sample the outputs from these lines, a flip-flop connected to said sampler means said flip-flop being alternately SET and RESET from pulses from the sample lines, and an output side to said flip-flop providing a binary count of the sampled line values in 8-4-2-1 code.

* * * * *